Dec. 6, 1966  W. FRANKE  3,289,655
ROTARY PISTON APPARATUS
Filed Dec. 30, 1963  2 Sheets-Sheet 1
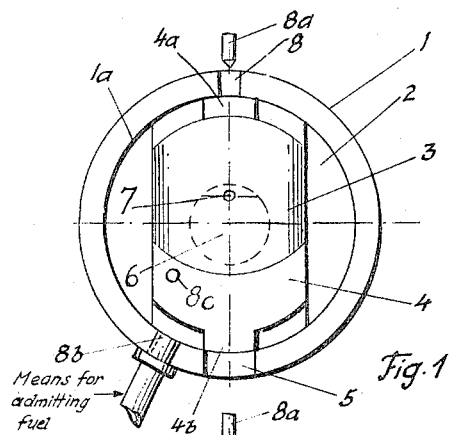
Fig. 1
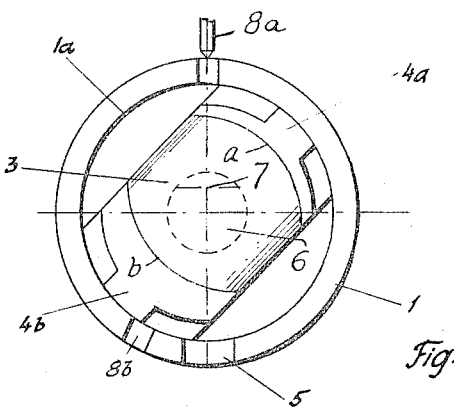
Fig. 2
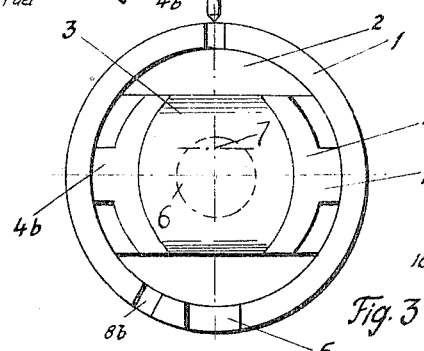
Fig. 3
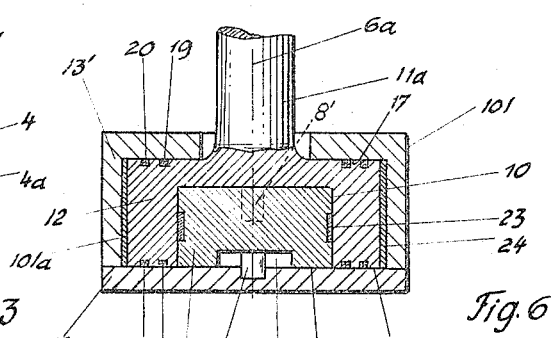
Fig. 6
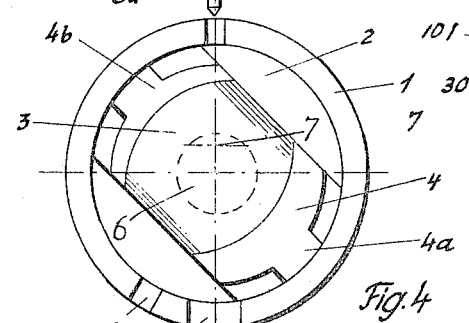
Fig. 4
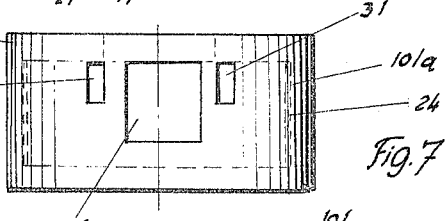
Fig. 7
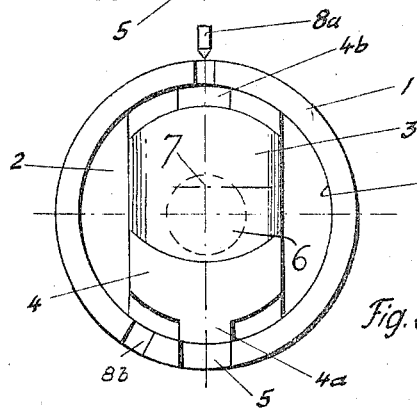
Fig. 5
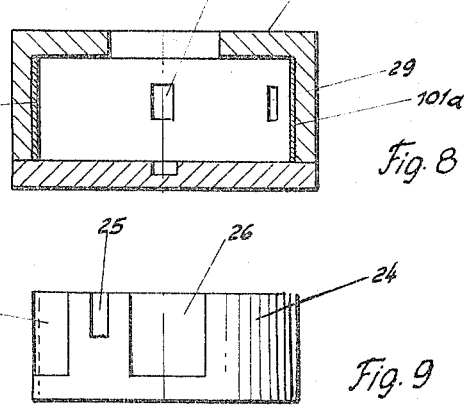
Fig. 8
Fig. 9
Inventor: Walter Franke
by: Michael S. Striker, his attorney Inventor:
Walter Franke
by: Michael S. Striker
his attorney United States Patent Office 3,289,655
Patented Dec. 6, 1966

1

3,289,655
ROTARY PISTON APPARATUS
Walter Franke, Maschen, Kreis Harburg, Germany
Filed Dec. 30, 1963, Ser. No. 334,339
Claims priority, application Germany, Dec. 29, 1962,
F 38,681
15 Claims. (Cl. 123—44)

The present invention relates to rotary piston apparatus in general, and more particularly to a rotary piston apparatus which may be utilized as an internal combustion engine, a pump, a compressor or a blower. In such apparatus, a piston rotates in a fixed housing to drive an output shaft or, alternatively, the shaft may rotate the piston in order to compress a hydraulic or pneumatic fluid when the apparatus is used as a pump or blower.

It is an important object of my invention to provide a very simple, compact, adjustable and highly reliable rotary piston apparatus which comprises a small number of component parts and which is especially suited to operate as an internal combustion engine.

Another object of the invention is to provide a rotary piston apparatus of the just outlined characteristics which may be combined with one or more additional apparatus to form a unit in order to displace large quantities of fluid or to produce a strong rotary torque upon one or more driven members.

A further object of the invention is to provide a rotary piston apparatus whose operation may be reversed and which may rotate one or more driven members without the interposition of crankshafts and similar costly and bulky motion transmitting devices.

A concomitant object of the invention is to provide a rotary piston engine which is capable of automatically sucking, compressing, igniting and expelling a fluid substance in response to rotation of its piston.

Still another object of the invention is to provide a rotary piston engine which is of exceptionally compact design and which may be utilized in all types of engine driven conveyances and other machines.

With the above objects in view, one feature of my invention resides in the provision of a rotary piston apparatus, such as an internal combustion engine, a pump or a blower, which comprises a fixed housing defining an internal space, a cylinder received in the housing to rotate about a first axis and defining a chamber which extends in a direction transversely to the axis thereof, a piston reciprocably received in the chamber and arranged to rotate about a second axis which is parallel with the axis of the cylinder, means (such as suitable igniter devices and conduits which admit a mixture of fuel and oxygen into the chamber) for reciprocating the piston in the chamber of the cylinder, and guide means operatively connected with the piston and with the housing so as to compel the piston to rotate about the second axis in response to reciprocation in the longitudinal direction of the chamber whereby the cylinder rotates with respect to the housing. If the apparatus of my invention is used as a pump or blower, the cylinder is rotated by a motor or the like so that the piston is compelled to reciprocate in response to rotation of the cylinder. On the other hand, if the apparatus is used as a motor or engine, the piston is reciprocated by compressed fluid to rotate the cylinder with respect to the housing.

The novel features which are considered as characteristic of the invention are set forth in particular in the appended claims. The improved apparatus itself, however, both as to its construction and its method of operation, together with additional features and advantages thereof, will be best understood upon perusal of the following detailed description of certain specific embodiments with reference to the accompanying drawings, in which:

2

FIG. 1 is an end view of the fixed housing in a rotary piston engine which embodies one form of my invention, the piston being shown in one of its end positions and one end wall of the housing being removed;

FIG. 2 is a similar end view of the fixed housing with the piston in a different position;

FIG. 3 illustrates the piston in a third position intermediate its end positions;

FIG. 4 shows the piston in a further position nearer to the second end position;

FIG. 5 shows the piston in the second end position;

FIG. 6 is an axial section through a second rotary piston engine which comprises a disk-shaped piston;

FIG. 7 is an axial section through the housing of the engine shown in FIG. 6, with the cylinder and piston omitted;

FIG. 8 is an elevational view of the housing for the engine of FIG. 6;

FIG. 9 is an elevational view of a regulating member in the engine of FIG. 7;

Figure 10:
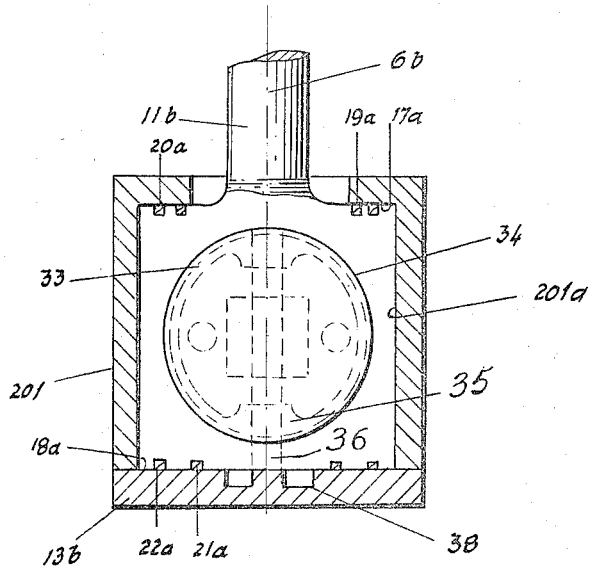
FIG. 10 is an axial section through a further rotary piston engine which comprises a cylindrical piston.

FIG. 1 illustrates a portion of a rotary piston apparatus here shown as an internal combustion engine which comprises a stationary housing 1 defining a cylindrical internal space 1a to accommodate a driven member here shown as a cylinder 2 which is snugly but rotatably received in the space 1a and one end face of which is provided with a specially configurated chamber or recess 4. This chamber extends in a direction transversely of (i.e., at right angles to) the axis of the housing 1 and receives a reciprocable piston 3. The cylinder 2 is connected to an output shaft 6 whose axis coincides with the axis of the housing 1. The axis 7 about which the piston 3 rotates is parallel with the axis of the output shaft 6. The piston 3 is connected with suitable guide means which compel it to rotate about the axis 7 while moving in the longitudinal direction of the chamber 4 so that the cylinder 2 and the output shaft 6 are compelled to rotate in a clockwise direction, as viewed in FIGS. 1–5. The housing 1 is provided with a first opening 8 which accommodates an igniter device 8a and, diametrically opposite this opening 8, the housing is provided with a second opening or outlet 5 which serves to permit escape of combustion products from the chamber 4.

In FIG. 1, the piston 3 is shown in one of its end positions in which its radial face a is adjacent to the opening 8. The extension 4a of the chamber 4 contains a compressed mixture of fuel and air which is ignited by the device 8a so that the mixture explodes and the resulting products of combustion force the radial face a to travel away from the extension 4a and, as a result of such movement, the piston causes the cylinder 2 and the output shaft 6 to rotate about the axis of the housing 1 because the piston is guided in such a way that it must rotate about the axis 7 at the time it reciprocates in the chamber 4.

FIG. 2 shows the piston in a different position in which the products of combustion contained in the chamber 4 adjacent to the radical face a continue to expand in order to drive the other radical face b toward the other extension 4b of the chamber. The extensions 4a, 4b are respectively sealed from the openings 8, 5 so that a combustible mixture which has been admitted into the chamber 4 at a point adjacent to the radial face b is being compressed as the piston 3 continues to travel toward the extension 4b. FIG. 3 shows the piston in a median position in which the radial faces a and b are equidistant from the internal cyclindrical surface of the housing 1 and in which the mixture contained in the chamber 4 adjacent to the radial face $b$ is partially compressed. The products of combustion filling the chamber 4 adjacent to the radial face $a$ continue to expand so that the piston 3 performs a composite movement including a translatory movement in the longitudinal direction of the chamber 4 and an angular movement about the axis 7.

FIG. 4 shows the piston 3 in a further position in which the mixture adjacent to the radial face $b$ is nearly fully compressed and in which the combustion products adjacent to the radial face $a$ are nearly fully expanded. Such combustion products escape through the opening 5 when the piston 3 reaches the position of FIG. 5 which occurs at the time the radial face $b$ is adjacent to the igniter device 8$a$ whereby the latter ignites the mixture in the chamber 4 (i.e., in the extension 4$b$) so that the piston reverses the direction of its movement with respect to the cylinder 2 and begins to move toward the extension 4$a$ and the operation is then repeated in the same way and in the same sequence as described above. Thus, during one-half of a full revolution, the piston will compress a fuel-air mixture and will expell the products of combustion which develop on ignition of the compressed mixture. The mixture may be admitted through an intake opening 8$b$ provided in the cylindrical wall of the housing 1 adjacent to and located past the opening 5, as seen in the direction in which the cylinder 2 rotates. The mixture may be injected through the opening 8$b$ by means of known injector devices.

Referring to FIGS. 6 to 9, there is shown a modified rotary piston engine which comprises a fixed cylindrical housing 101 defining an internal space 101$a$ for a rotary cup-shaped cylinder 12 which is connected with a coaxial output shaft 11. The common axis 6$a$ of the shaft 11 and cylinder 12 coincides with the axis of the housing 101. The piston 9 resembles a disk which is received in a recess or chamber 10 provided in the lower end face of the cylinder 12. The lower end wall 13 of the housing 101 is detachable to allow for insertion of the piston 9 into the chamber 10, and this lower end wall carries a guide pin 14, here shown as a short roller, which extends into a cam groove 15 provided in the lower end face 16 of the piston 9. The pin 14 is free to rotate in but is held against other movements with respect to the end wall 13. The axis of the pin 14 (corresponding to the axis 7 shown in FIGS. 1–5) is parallel with but spaced from the axis 6$a$. It goes without saying that the position of the pin 14 and cam groove 15 may be reversed without departing from the spirit of my invention.

The end faces 17, 18 of the cylinder 12 are provided with concentric annular recesses which receive pairwise arranged sealing rings 19, 20 (end face 17) and 21, 22 (end face 18) to prevent uncontrolled escape of combustion products from the chamber 10 and to prevent uncontrolled entry of air into this chamber. The output shaft 11 extends through an aperture provided in the top end wall 13' of the housing 101 and serves to rotate a driven apparatus, not shown.

As best shown in FIG. 7, the internal space 101$a$ of the housing 101 accommodates an adjustable tubular regulating member here shown as a sleeve 24 which surrounds the cylinder 12 and which is provided with a series of suitably distributed openings adapted to be moved into registry with complementary openings in the cylindrical wall or shell of the housing 101 to thereby regulate the admission of fuel and air and expulsion of combustion products from the chamber 10. The sleeve 24 is provided with an inlet opening 25 (shown in FIG. 9) which may be brought into partial or full registry with the opening 30 or 31 of the housing 101 (each of the openings 30, 31 corresponds to the opening 8$b$ shown in FIG. 1), and with two comparatively large outlet openings 26, 27 each of which may be brought into registry with an outlet opening 32 in the cylindrical wall of the housing 101. The opening 32 corresponds to the opening 5 shown in FIG. 1. The sleeve 24 is further provided with openings 28, 29 (shown in FIG. 7) which are located opposite the outlet openings 26, 27 and each of which may be moved into registry with an opening 8' in the cylindrical wall of the housing 101. The opening 8' corresponds to the opening 8 shown in FIG. 1 and is adjacent to a suitable spark plug or another igniter device, not illustrated in FIGS. 6 to 9.

Depending on the angular position of the sleeve 24, the inlet opening 30 or 31 of the housing 101 will register with the inlet opening 25 of the sleeve and the outlet opening 26 or 27 of the sleeve will register with the outlet opening 32 of the housing. The peripheral surface of the piston 9 is provided with an annular channel which receives a split ring 23.

Otherwise, the operation of the engine shown in FIGS. 6 to 9 is the same as described in connection with FIGS. 1 to 5. Thus the disk shaped piston 9 will travel back and forth along the chamber 10 and will simultaneously rotate about the axis of the guide pin 14 because it is operatively connected with the guide pin by the groove 15. The cylinder 12 will sweep along the internal surface of the sleeve 24 so that the extensions of its chamber at the opposite sides of the piston 9 will alternatively register with the inlet and outlet openings of the sleeve to respectively receive a mixture of fuel and air and to discharge the products of combustion which develop when the mixture is ignited while the extensions travel along the openings 8'.

In order to avoid excessive wear, the guide means including the pin 14 and the end wall 13 are made of hard tool steel or similar wear-resistant material. It is often sufficient to harden only the zones which are adjacent to the surface of the pin 14 and the surface surrounding the groove 15.

The regulator sleeve 24 enables an operator to reverse the direction in which the cylinder 12 rotates, and such adjustments may be carried out while the engine is in actual use. Of course, the sleeve is provided with suitable turning means, not shown, which may be engaged by hand or by remote control in order to change the angular position of the sleeve 24 with reference to the housing 101.

Figure 11:
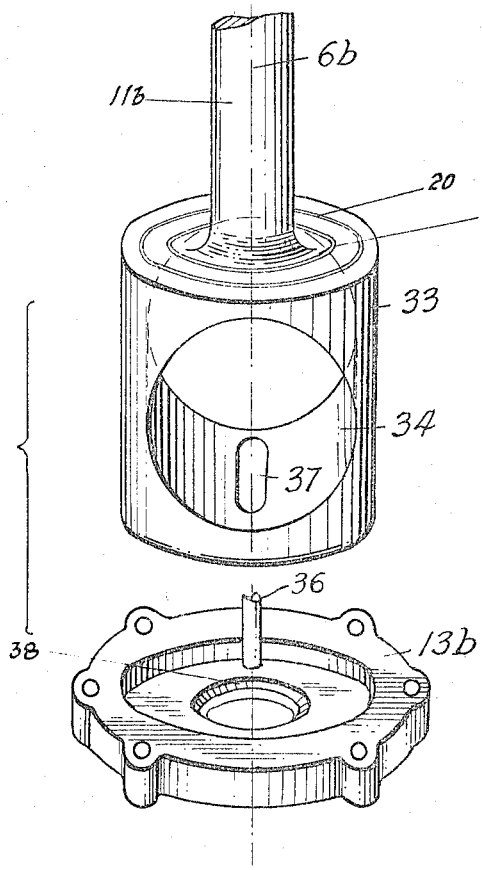
FIG. 11 is an exploded perspective view of certain component parts of the engine which is illustrated in FIG. 10.

Referring finally to FIGS. 10 and 11, there is shown a third two-stroke rotary piston engine including a fixed housing 201 defining an internal space 201$a$ which receives a rotary driven element here shown as a cylinder 33 secured to a coaxial output shaft 11$b$ which rotates about the axis 6$b$ of the housing 201. The cylinder 33 is actually an enlarged head of the output shaft 11$b$ and is provided with a cylindrical bore or chamber 34 whose axis is perpendicular to the axis 6$b$. This chamber 34 receives a reciprocable cylindrical piston 35. The lower end face 18$a$ of the cylinder 33 is provided with a slot 37 which communicates with the chamber 34 and which accommodates a portion of a guide pin 36 to the piston 35 and extending into an elongated cam groove 38 provided in the bottom end wall 13$b$ of the housing 201. The end faces 17$a$, 18$a$ of the cylinder 33 are provided with concentric recesses for sealing rings 19$a$, 20$a$, 21$a$, 22$a$.

The operation of the engine shown in FIGS. 10 and 11 is analogous to that of the engine shown in FIGS. 1 to 5 with the exception that the piston 35 resembles a solid cylinder and is guided in a cylindrical chamber 34. The various openings provided in the cylindrical wall of the housing 201 may be arranged in the same way as described in connection with FIGS. 1–5 or 6–9. The guide pin 36 and groove 38 may be replaced by suitable push rods or other types of guide means which compel the piston to rotate about an axis which is parallel with the axis of the cylinder.

Of course, it is equally possible to modify the construction of the engine in such a way that oxygen necessary to expel the combustion products from the cylinder chamber may be admitted through the one or the other end wall of the housing, i.e., in the axial direction of the cylinder. In such constructions, the direction of rotation may be reversed merely by changing the exact timing of ignition and fuel injection. Also, two or more engines of the type shown in FIGS. 1–5, 6–9 and 10–11 may be combined into a unit to impart high torque to a single output shaft or to a series of output shafts whose number is less than the number of engines.

Without further analysis, the foregoing will so fully reveal the gist of the present invention that others can, by applying current knowledge, readily adapt it for various applications without omitting features which constitute the essential characteristics of the generic and specific aspects of this invention and, therefore, such adaptations should and are intended to be comprehended within the meaning and range of equivalence of the following claims.

What is claimed as new and desired to be secured by Letters Patent is:

1. A rotary piston engine, comprising a fixed housing defining a cylindrical space and having spaced inlet and outlet openings communicating with said space; a rotary cylinder coaxially received in said space and defining a chamber extending transversely thereof, said chamber having spaced extensions which sweep consecutively along said openings when the cylinder rotates; igniter means adjacent to one of said openings, said one opening being located on one side of an axial plane of symmetry thru said cylindrical space and the other of said openings being located on the opposite side of said axial plane of symmetry; means for admitting a combustible fluid into said chamber through said other of said openings; a piston reciprocably received in said chamber intermediate said extensions and arranged to rotate about a second axis which is parallel with but spaced from the axis of said cylinder; and guide means operatively connecting said piston with said housing so that the piston rotates about said second axis in response to reciprocation thereof whereby the piston automatically compresses the fluid admitted through said other opening and such fluid is compressed prior to being ignited by said igniter means to develop combustion products which expand to reverse the direction of movement of said piston in said chamber, said housing having an outlet opening also located on said opposite side of said plane of symmetry in the region of said other opening through which the products of combustion escape via said extensions prior to passage of said extensions along said other opening.

2. An engine as set forth in claim 1, further comprising a tubular regulator member rotatably received in said housing and having openings movable into and out of registry with the openings of said housing, said regulator member surrounding said cylinder.

3. An engine as set forth in claim 2, wherein said tubular regulator member is a sleeve having a first opening movable into and out of registry with said other opening, two outlet openings each movable into registry with the outlet opening of said housing, and two additional openings each movable into registry with said opening.

4. A two-stroke engine as set forth in claim 1, wherein said outlet opening is located diametrically opposite said one opening so that said piston alternatively expels products of combustion through said extensions in response to consecutive angular displacements of said cylinder through one-half of a full revolution.

5. An engine as set forth in claim 1, further comprising sealing means disposed between said cylinder and said piston.

6. An engine as set forth in claim 1, further comprising means for admitting oxygen into said chamber at predetermined intervals so that the oxygen expels products of combustion when said extensions register with said outlet opening.

7. An engine as set forth in claim 6, wherein oxygen is admitted in the axial direction of said cylinder.

8. A rotary piston engine according to claim 1, said fixed housing having a cylindrical wall and end wall means, said cylinder having an end face adjacent to said end wall means and said chamber being provided in said end face and extending transversely of the axis thereof, said piston means being reciprocably received in said chamber in said end face, and said guide means comprising a guide pin secured to one of said two last mentioned means and a cam groove provided in the other of said two last mentioned means and receiving said pin so that said piston means is compelled to rotate about said second axis in response to reciprocation thereof to thereby rotate said cylinder in said space.

9. A rotary piston engine as set forth in claim 8, wherein said guide pin is secured to said piston means.

10. A rotary piston engine as set forth in claim 8, wherein said guide pin is secured to said end wall means.

11. A rotary piston engine according to claim 1, said housing having a cylindrical wall and end wall means, said cylinder member being coaxially received in said space and having an end face adjacent said end wall means, a slot extending inwardly from said end face and communicating with said chamber, said piston means being cylindrical and being reciprocably and slidably received in said chamber, and said guide pin extending through said slot into said cam groove.

12. An engine as set forth in claim 11, wherein said guide pin is secured to said piston means.

13. A rotary piston engine according to claim 1, said piston having a cylindrical peripheral surface and an annular recess provided in said peripheral surface, and a split ring received in said recess.

14. A rotary piston engine according to claim 1, said housing comprising a cylindrical wall and two spaced end walls, said rotary cylinder having two end faces each of which is adjacent to one of said end walls and each of which is provided with at least one concentric annular recess; annular sealing means received in said recesses and sealingly engaging the respective end walls.

15. An engine according to claim 1, wherein each of said spaced extensions of said chamber has a cross section in a plane normal to the axis of said chamber which is smaller in area than the cross section at any plane normal to said axis thereof through the remaining portions of said chamber.

References Cited by the Examiner
UNITED STATES PATENTS

| 1,495,611 | 5/1924 | Parrouffe | 91—202 |
| 2,551,430 | 5/1951 | Estey | 91—202 X |

FOREIGN PATENTS

| 798,519 | 3/1936 | France. |
| 1,068,080 | 2/1954 | France. |
| 1,275,080 | 9/1961 | France. |
| 314,677 | 10/1919 | Germany. |

MARK NEWMAN, *Primary Examiner.*

WENDELL E. BURNS, *Examiner.*